United States Patent Office 3,775,370
Patented Nov. 27, 1973

3,775,370
MANUFACTURE OF OXYLMETHYLENE
POLYMERS
Bruno Sander, Ludwigshafen, Germany, assignor to
Badische Anilin- & Soda-Fabrik Aktiengesellschaft,
Ludwigshafen am Rhine, Germany
No Drawing. Filed July 27, 1971, Ser. No. 166,573
Claims priority, application Germany, Aug. 5, 1970,
P 20 38 908.6
Int. Cl. C08g 1/20
U.S. Cl. 260—67 FP                            6 Claims

ABSTRACT OF THE DISCLOSURE

A process for the polymerization or copolymerization of trioxane, in which the catalyst used is a solution of an ester or mixed anhydride of perchloric acid in a diether of a glycol.

---

It is known that certain esters and mixed anhydrides of perchloric acid are effective as catalysts for polymerization reactions of formaldehyde and trioxane (German Pat. 1,152,818). Unlike ansolvo acids of the boron trifluoride type, these catalysts do not promote resplitting of formaldehyde polymers during the course of the reaction. Moreover, a measure of end-group closure occurs in the formaldehyde polymers formed due to the alkyl or acyl radical of the perchloric acid compound being incorporated in the ends of the polymer chains.

A slight drawback of these perchloric acid compounds is that it is not possible to control the course of the reaction when polymerizing trioxane with conventional comonomers; after a distinct induction period of from 1 to 2 minutes, a violent reaction takes place which leads to local overheating of the polymer already formed and thus to poor products having, in particular, uncontrollably reduced molecular weight and decreased thermal stability. In addition, the weight losses which are caused by degassing and which have to be tolerated in subsequent processing of the products are larger when the product is subjected during manufacture to unduly high temperatures in the presence of the catalyst.

I have now found that trioxane, with or without conventional comonomers which are suitable for cationic copolymerization with trioxane, can be polymerized in a particularly advantageous manner when the polymerization catalyst used is a solution of an ester or mixed anhydride of perchloric acid in a diether of a glycol.

Examples of suitable comonomers are the cyclic or linear formals or acetals of dihydric alcohols, such as 1,3-dioxolane, butanediol-1,4-formal or their open-chain oligomers or polymers. These comonomers are generally compounds which are capable of introducing oxyalkylene groups of from, say, 2 to 5 coherent carbon atoms into the oxymethylene chain of the polymers. Other comonomers which may also be used are all those monofunctional compounds which are normally referred to as modifiers, such as the acetals and formals of monohydric alcohols, the alcohols themselves and the small quantities of water acting as chain-transfer agent, the presence of which during polymerization cannot, as a rule, be completely avoided.

Comonomers of this kind as well as polyfunctional monomers such as are used, for example, in terpolymers to produce crosslinking, or other compounds which are copolymerizable by cationic catalysts, for example unsaturated compounds of the styrene type, are usually used in minor quantities compared with the trioxane, in particular in amounts of from 0.1 to 10 mol percent.

Diethers of glycols which may be used according to the invention are for example the dimethyl and diethyl ethers of ethylene glycol, of diethylene glycol, of triethylene glycol and of tetraethylene glycol, which are known to be solvents. Mixed ethers of this kind and mixtures thereof are, of course, equally suitable for use as solvents in accordance with the present invention. It is preferred to use dimethyl ethers of a glycol having from 2 to 10 carbon atoms arranged in a chain of carbon atoms which may or may not be interrupted by hetero atoms. Ethers of dihydric alcohols of which the carbon chain may be regarded as a linear acetal do not belong to the class of solvents used in the present invention.

The compounds of perchloric acid to be used in accordance with the present invention are strongly polarized esters and mixed anhydrides of perchloric acid. Examples of suitable esters are the tert-butyl and methoxymethyl esters of perchloric acid and, for example, the mixed anhydride of perchloric acid with acetic acid or benzoic acid.

Copolymers of trioxane which have been manufactured by the process of the invention and which may be used as plastics materials are found to have particularly low concentrations of unstable portions when examined immediately after their manufacture. They are obtained from the monomers at conversions of more than 90%. A particularly surprising feature of the process of the invention is that extremely small amounts of perchloric acid compound are required in order to achieve such high conversions; in general less than 1 p.p.m. of the compound and in particular about 0.1 to 0.5 p.p.m., based on the amount of monomers used, is necessary. Moreover, it is obvious that such low catalyst concentrations place only very slight demands on the subsequent purifying operations and may in many cases remain in the polymer without detriment.

In this connection it would appear advisable to consider the manufacture of the perchloric acid compounds and their solutions: Esters and mixed anhydrides of perchloric acid are obtained in a conventional manner in solution by reacting silver perchlorate with the appropriate alkyl halides or acyl halides in for example nitromethane, nitrobenzene or halogenated hydrocarbons of the ethylene chloride type. If, in this manufacturing process, the said solvents are replaced by one of the glycol ethers proposed by the invention, there is directly obtained a perchloric acid compound solution which is suitable for carrying out the process of the invention. Advantageously, the proportions are so selected that the solution of the perchloric acid compound in glycol ether has a concentration of approximately 0.1 to 5%, particularly of from 0.5 to 1.5%, by weight. To enable the catalyst to be fed to the reaction in the amounts stated above with reference to the amount of monomers used, it may be necessary, for practical reasons, to further dilute the solutions. For example, it has been found that catalyst concentrations of from 0.005 to 0.05% by weight in the solution, which need not contain only glycol ether as solvent, give satisfactory results.

In order to distinguish the present invention from the prior art, it should be pointed out that the use of solutions of perchloric acid itself in certain ethers such as is described for example in Belgian Pat. 727,848, does not touch upon the present invention. This literature reference describes the use of glycol diethers as well as that of cyclic compounds of the 1,4-dioxane type for example. The advantages of the present process cannot be achieved at all or not to the same extent with such compounds. Moreover, perchloric acid itself is considerably inferior to and obviously not equivalent to the perchloric acid esters or perchloric anhydrides to be used according to the present invention as regards catalytic efficiency and particularly with regard to the stability and yield of the product obtained. Particularly striking for example is the very small quantity of perchloric acid compound which is required to effect a given conversion as compared with the amount of perchloric acid required. It should be borne in mind that the residues of catalyst remaining in the polymer in bulk polymerization are capable of destroying the polymers which have formed. This secondary damage to the polymer diminishes as the amount of catalyst used decreases. Consequently, the thermal stability in particular and the inherent color of the finished oxymethylene polymer can be much improved by using smaller amounts of catalyst.

Surprisingly, in the present invention the conversion is very high and the induction period is very short despite the small amount of catalyst used. The induction periods measured are generally between 5 and 20 seconds, this being sufficient to achieve adequate mixing of the catalyst and molten monomers.

Preparation of catalyst according to the invention

In the following examples there was used a solution of tert-butyl perchlorate in ethylene glycol dimethyl ether which was prepared in the following manner:

In a 1-liter flask having a ground glass stopper, 11.05 g. of silver perchlorate monohydrate is dissolved in approximately 300 ml. of pure ethylene glycol dimethyl ether. After dissolution is complete, 5.41 ml. of tert-butyl chloride is added while shaking. The solution is made up to 1 liter with ethylene glycol dimethyl ether and allowed to stand for about 24 hours. At the end of this period, the precipitated silver chloride has settled at the bottom of the flask and can be separated by decantation and filtration.

Solutions of tert-butyl perchlorate in diethylene glycol dimethyl ether and, for the purpose of comparison, in ethylene chloride are prepared in a similar manner. Also for the purposes of comparison, a solution of perchloric acid in ethylene glycol dimethyl ether is prepared. It is obvious that, in order to achieve the most advantageous concentration of catalyst in the solution, which may best be determined by preliminary experiment, it is possible to use, as diluents, not only the said diethers but also specific amounts of inert diluents such as cyclohexane, di-n-butyl ether or any other suitable solvent capable of dissolving the perchloric acid compound.

EXAMPLES 1 TO 4

In a double-walled mold having an internal width of 3.0 cm., a length of 40 cm. and a height of 30 cm. and kept at a temperature of 60° C. by a thermostatically controlled stream of water, the catalyst solutions given in the following table are added to 3,900 g. of a liquid mixture consisting of 97% of trioxane, 2.88% of butanediol-1,4-formal and 0.12% of di-n-butylformal and intimately mixed therewith.

After the induction period is over, the mixture becomes turbid and solidifies. 5 minutes after the commencement of polymerization, the polymer block is removed from the cell and immediately comminuted and ground. Unreacted trioxane is removed from the ground material by boiling a mixture of the latter with aqueous methanol containing sodium carbonate for 1 hour with stirring. The polymer is filtered off, washed with water and dried in vacuo at 80° C. The conversion (taking into consideration losses due to evaporation), the stable portion and the K value of the polymer are then determined. The catalyst solution used and the results of polymerization are given in the following table.

TABLE 1

| | Conc. of catalyst soln. (mg./ml.) | Solvent used for diluting catalyst soln. | Conc. of tert-butyl perchlorate in monomer mixture (p.p.m.) | Induction period (sec.) | Percent Conversion (crude polymer obtained) | Stable portion of polymer | K value |
|---|---|---|---|---|---|---|---|
| Example: | | | | | | | |
| 1 | 0.1 | Ethylene glycol dimethyl ether | 0.3 | 15 | 93.1 | 93.2 | 75.3 |
| 2 | 0.1 | Diethylene glycol dimethyl ether | 0.3 | 19 | 95.2 | 91.7 | 76.1 |
| 3 | 0.1 | Diethylene glycol dimethyl ether/cyclohexane mixture (1:1) | 0.3 | 22 | 91.8 | 94.8 | 75.7 |
| 4 | 0.1 | Diethylene glycol dimethyl ether/di-n-butyl ether mixture (1:1) | 0.3 | 20 | 94.6 | 92.7 | 76.0 |
| Comparative experiment.[1] | 0.16 | Ethylene chloride | 1.3 | 143 | 86.7 | 90.1 | 75.8 |

[1] Tert-butyl perchlorate prepared in ethylene chloride.

NOTE.—In Examples 1 and 2 the catalyst was prepared in ethylene glycol dimethyl ether, and in Examples 3 and 4 it was prepared in diethylene glycol dimethyl ether.

EXAMPLES 5 and 6

The catalyst solutions were prepared and the experiments carried out in the manner described above for Examples 1 to 4. Examples 5 and 6 and the comparative experiment are intended to show that the catalytic action of perchloric acid is basically different from that of the perchloric acid compounds used in the present invention. These experiments also demonstrate that, when glycol ethers in accordance with the present invention are used, the presence of small amounts of water, such as occur, for example, when the silver perchlorate used is a hydrate of silver perchlorate, in no way influences the nature of the reaction or the results thereof. It is probable that other small quantities of water present during the reaction as impurities are also rendered ineffective in this manner and therefore cannot act as chain stoppers.

TABLE 2

| | Catalyst used | Conc. of catalyst soln. (mg./ml.) | Solvent used for diluting catalyst solution | Amount of catalyst based on weight of monomers (p.p.m.) | Induction period (sec.) | Percent Conversion (crude polymer contained) | Stable portion of crude polymer | Total yield of stable polymer | K value |
|---|---|---|---|---|---|---|---|---|---|
| Example: | | | | | | | | | |
| 5 | Tert-butyl perchlorate from AgClO₄ monohydrate. | 0.1 | Diethylene glycol dimethyl ether. | 0.12 | 20 | 93.2 | 96.2 | 89.7 | 75.8 |
| 6 | Tert-butyl perchlorate from anhydrous AgClO₄. | 0.1 | do | 0.17 | 22 | 94.7 | 94.0 | 89.0 | 76.9 |
| Comparative experiment. | HClO₄ | 0.1 | do | 0.16 | 21 | 84.3 | 88.4 | 74.6 | 76.3 |

NOTE.—The perchloric acid esters used in Example 5 and 6 were prepared in diethylene glycol dimethyl ether. In the catalyst solution used in Example 5 the amount of water derived from the silver perchlorate monohydrate was found to be 850 p.p.m. according to the Karl Fischer method.

The resulting crude polymers were mixed in a conventional manner with equal amounts of conventional stabilizers, extruded and granulated.

Weight losses after heating for 2 hours at 220° C. are as follows:

|  | Percent | |
|---|---|---|
|  | Under nitrogen | In air |
| Product of— |  |  |
| Example 5 | 0.12 | 0.51 |
| Example 6 | 0.18 | 0.59 |
| Comparative experiment | 0.3–0.6 | 0.9–1.2 |

EXAMPLE 7

This experiment was carried out using a smaller amount of comonomer and a smaller amount of modifier (98% of trioxane, 2% of butanediol-1,4-formal and 0.07% of di-n-butylformal) than in the above examples. Table 3 shows that in an attempt to produce high molecular weight products better results as regards the stable portion in the polymer, the total yield and the molecular weight of the product are achieved with tert-butyl perchlorate in diethylene glycol dimethyl ether than with perchloric acid in diethylene glycol dimethyl ether.

I claim:
1. process for the polymerization of trioxane to produce a thermally stable, high molecular weight polymer in the presence of a derivative of perchloric acid as catalyst, wherein the polymerization catalyst used is a solution of an ester of perchloric acid and a mono- or polyhydric alcohol or a mixed anhydride of perchloric acid and a carboxylic acid respectively dissolved in a dialkyl ether of an alkylene glycol having 2–10 carbon atoms with a concentration of the perchloric acid compound of 0.005% to 5% by weight in the solvent.

2. A process as claimed in claim 1, wherein the polymerization catalyst used is a solution of tert-butyl perchlorate in ethylene glycol dimethyl ether.

3. A process as claimed in claim 1, wherein the polymerization of trioxane is a copolymerization with 0.1–10 mol percent of another monomer which is copolymerizable with trioxane, said comonomer being an unsaturated compound or an oxygen-containing comonomer selected from the group consisting of cyclic ethers and linear formals and acetals.

4. A process as claimed in claim 1, wherein said catalyst is the tert-butyl ester of perchloric acid or the methoxymethyl ester of perchloric acid.

5. A process as claimed in claim 1, wherein said catalyst is the mixed anhydride of perchloric acid with acetic acid or benzoic acid.

6. A process as claimed in claim 1, wherein said catalyst is the tert-butyl ester of perchloric acid or the methoxymethyl ester of perchloric acid in the dimethyl or diethyl ether of ethylene glycol, diethylene glycol, triethylene glycol or tetraethylene glycol.

TABLE 3

|  | Catalyst used | Conc. of catalyst soln. (mg./ml.) | Solvent used for diluting catalyst solution | Amount of catalyst based on weight of monomers (p.p.m.) | Induction period (sec.) | Conversion (crude polymer contained) | Stable portion of crude polymer | Total yield of stable polymer | K value |
|---|---|---|---|---|---|---|---|---|---|
|  |  |  |  |  |  | Percent | | | |
| Example 7 | Tert-butyl perchlorate (prepared as in Ex. 6). | 0.1 | Diethylene glycol dimethyl ether. | 0.2 | 30 | 92.6 | 90.1 | 83.4 | 86.4 |
| Comparative experiment | HClO₄ | 0.1 | do | 0.2 | 20 | 91.0 | 81.9 | 74.5 | 728 |

References Cited

UNITED STATES PATENTS 3,122,525  2/1964  Kern et al. _____ 260—67 FP
3,183,212  5/1965  Hopff et al. _____ 260—67 FP

FOREIGN PATENTS 1,206,587  12/1965  Germany _____ 260—67 FP
1,206,588  12/1965  Germany _____ 260—67 FP WILLIAM H. SHORT, Primary Examiner L. M. PHYNES, Assistant Examiner U.S. Cl. X.R.

260—73 R

UNITED STATES PATENT OFFICE
CERTIFICATE OF CORRECTION

Patent No. 3,775,370            Dated November 27, 1973

Inventor(s) Bruno Sander

It is certified that error appears in the above-identified patent and that said Letters Patent are hereby corrected as shown below:

Column 6, Table 3, K value column of Comparative Experiment, "728" should read -- 72.8 --.

Column 6, line 2, insert -- A -- before "process".

Signed and sealed this 12th day of November 1974.

(SEAL)
Attest:

McCOY M. GIBSON JR.          C. MARSHALL DANN
Attesting Officer            Commissioner of Patents